INVENTORS
CARL THUMIM
NICHOLAS HERMAN
BY JAMES DES JARDINS

OSTROLENK, FABER, GERB & SOFFEN
ATTORNEYS

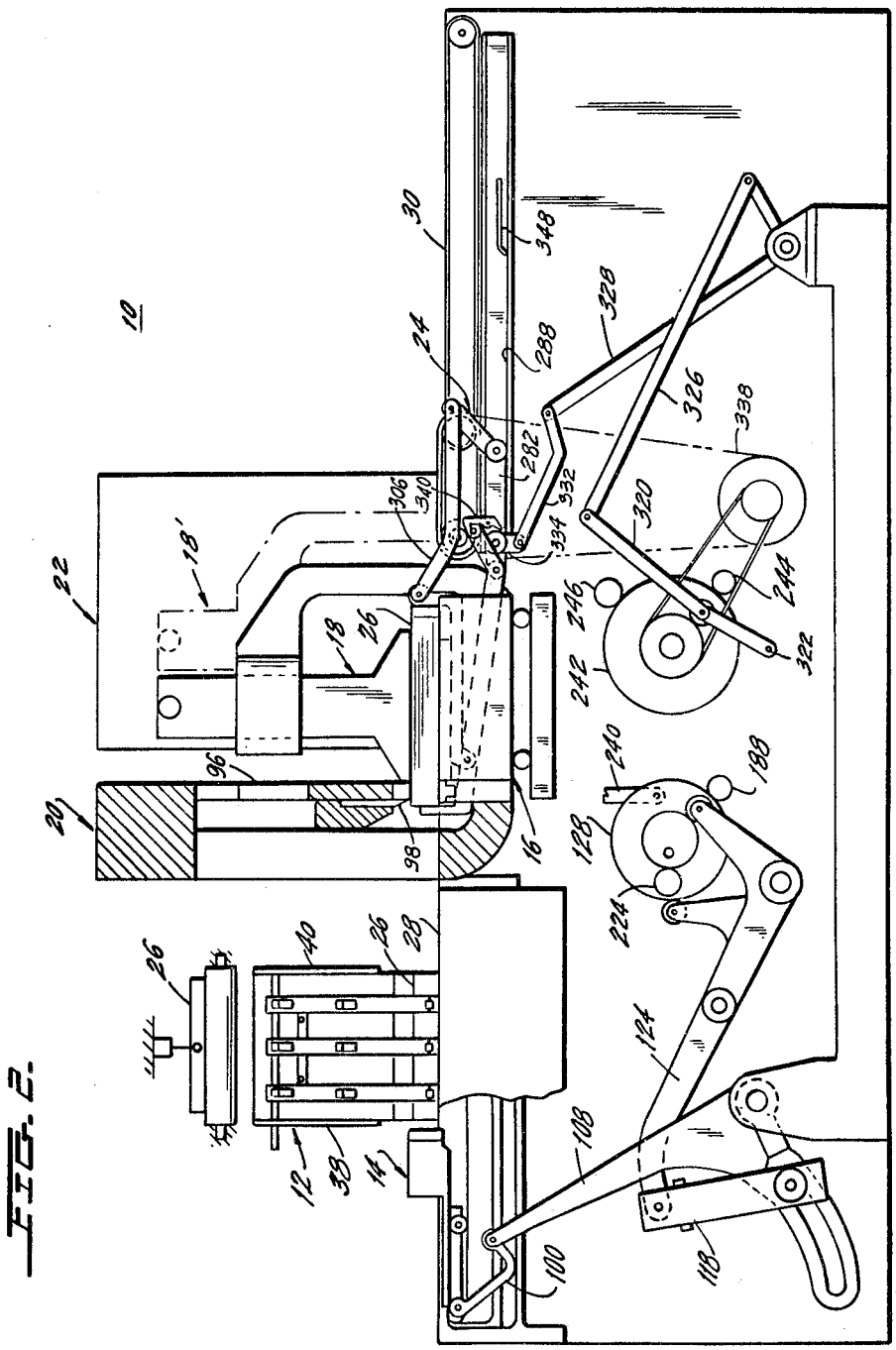

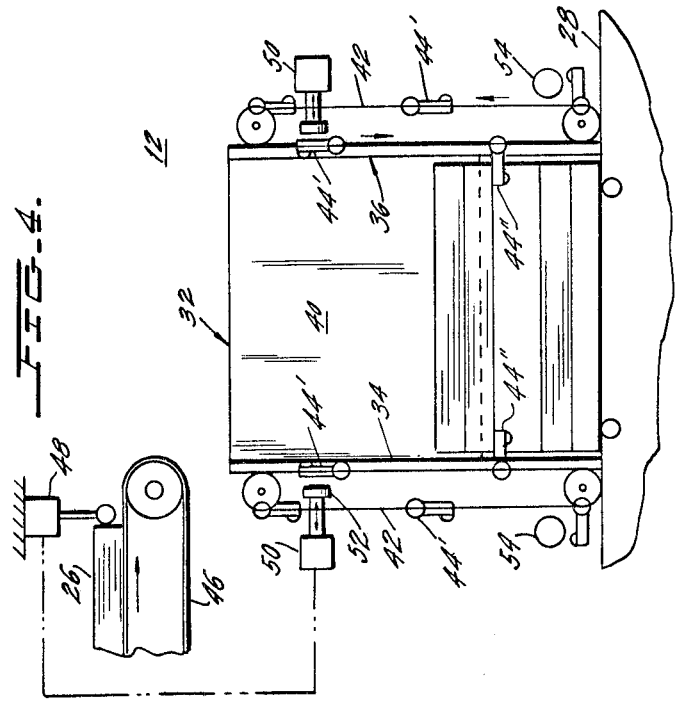
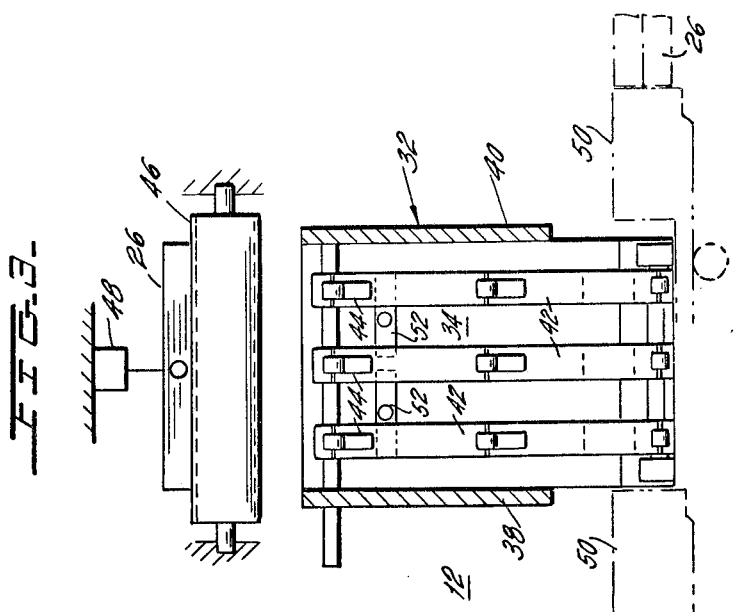

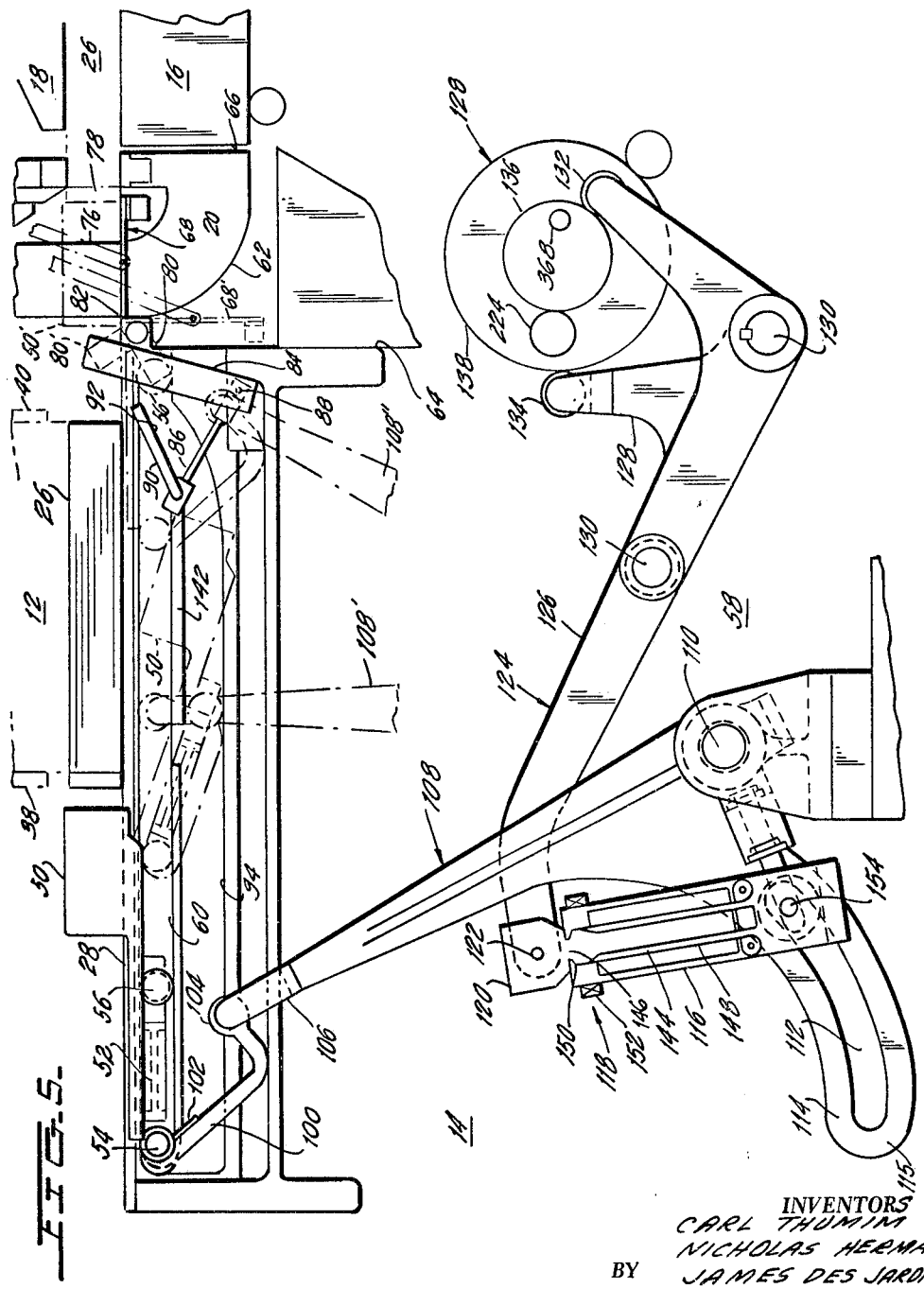

United States Patent Office 3,510,123
Patented May 5, 1970

3,510,123
DEPOSITING AND STACKING MECHANISM FOR CONTINUOUS THREE-KNIFE TRIMMER
Carl Thumim, Chicago, Nicholas Herman, Palatine, and James Des Jardins, Chicago, Ill., assignors to Miehle-Goss-Dexter, Incorporated, Chicago, Ill., a corporation of Delaware
Original application Mar. 10, 1966, Ser. No. 533,328, now Patent No. 3,424,044, dated Jan. 28, 1969. Divided and this application June 13, 1968, Ser. No. 775,209
Int. Cl. B65h 31/04
U.S. Cl. 271—86                   4 Claims

ABSTRACT OF THE DISCLOSURE

Depositing and stacking mechanism including a pair of oppositely disposed endless loop belt walls, which belts include a plurality of inwardly projecting fingers pivotally mounted on the belt and selectively movable between a projecting support position in which the fingers are capable of supporting material and a non-projecting, non-supporting position, and automatic means for shifting the fingers between these two positions on the occurrence of predetermined events.

This is a division of application Ser. No. 533,328 filed Mar. 10, 1966, now U.S. Pat. No. 3,424,044.

This invention relates to cutting apparatus and more particularly relates to a depositing and stacking mechanism for a continuous three-knife trimmer which trimmer is capable of accurately trimming three edges of a book or other similarly stacked paper material at an extremely high rate of speed.

The paper cutting and trimming industry has long felt the need for a continuous high-speed trimmer capable of accurately trimming three edges of a book, magazine or other similarly stacked paper material such that the output from such machine or trimmer requires no further trimming and can be forwarded to the final steps of manufacture which might include gluing, binding, etc. The instant invention provides depositing and stacking mechanism for such a high-speed continuous three-knife trimmer, which trimmer is fully automatic, highly accurate, and capable of trimming three sides of a book, stack of books, or paper at rates as high as or better than 100 units per minute.

Basically the mechanism of the instant invention is used in conjunction with a three-knife trimmer which may be said to include eight sub-assemblies classified as follows: (1) stacking mechanism for depositing a predetermined quantity of material at the input side of the machine; (2) input feed mechanism for delivering the quantity of material deposited by the stacking mechanism onto a movable table located in the cutting area of the machine; (3) stop mechanism for accurately positioning the material on the table; (4) a transportable clamp mechanism for securely clamping the deposited material onto the table; (5) a front knife assembly for trimming a trailing edge of the material clamped on the table by the transportable clamp mechanism; (6) table operating mechanism for moving the table between its first position in which the material is originally stacked thereon, and a second position a predetermined distance to the rear of the machine whereby side knife assemblies may cut the sides of the material without interfering with the front knife assembly; (7) side knife assemblies for trimming the sides of the material once the table has moved to its second position; and (8) delivery mechanism for withdrawing the material from the cutting area of the machine to the output thereof whereby the material is now completely trimmed and ready to be passed on to the next step of manufacture.

It is a feature of the instant invention that all eight sub-assemblies are coordinated and synchronized at a predetermined rate of speed, hereinafter termed cycle speed, such that all sub-assemblies will perform their designated operation at virtually the exact instant the material is properly positioned to be operated thereon. Thus a high-speed assembly line operation is achieved whereby material is continually fed into the machine at one end and continually fed out of the machine in its trimmed condition at the other end thereof with no wasted time lags inbetween.

Since the present invention is concerned with the depositing and stacking mechanism, this mechanism will now be described. It includes subassembly (1) mentioned above.

The stacking mechanism includes a containing enclosure having a pair of oppositely disposed walls each of which comprises at least one closed loop endless belt upon which are pivotally mounted a plurality of material supporting projecting fingers. Such fingers are automatically movable from a non-supporting, to a material supporting position after a predetermined quantity of material has been stacked on the fingers therebelow. Thus, for example, after a predetermined number of books have been stacked on one pair of the projecting fingers, a second pair of fingers is automatically extended to its supporting position whereby the next batch of exactly counted books or material may be accumulated. As the endless belts are rotated, the pairs of projecting fingers consecutively pass under and deposit the measured quantity of material on a work surface whereby they may be then fed into the cutting area of the machine by the input feed mechanism, to be described below.

As one further comment directed to the stacking mechanism, it is noted that the containing enclosure includes a second pair of walls oriented transversely to the walls defined by the endless belts. The bottom of such transversely oriented walls are spaced from the work surface upon which the material is deposited such that a pusher or transport means of the input feed mechanism may pass through the containing enclosure to feed the material deposited on the work surface into the cutting area of the machine.

The input feed mechanism includes the above noted pusher or transport means which travels above the work surface and through the containing enclosure of the stacking mechanism to feed the predetermined quantity of material to a second position on the aforementioned movable work table which, at present, is occupying its first position.

As soon as the pusher or transport means is through the containing enclosure of the stacking mechanism and as it continues its path of travel to feed the material onto the work table, the cycle speed chosen for the entire apparatus and at which speed the endless belts of the stacking mechanism are operating, assures that the next quantity of material is immediately deposited upon the work surface.

In order to prevent interference between the transport means or pusher and the subsequently deposited quantity of material, the input feed mechanism is provided with automatic guide means by which the pusher is returned to its original or starting position in a path of movement which is beneath the work surface. Thus the stacking mechanism can deposit the next quantity of material to be cut on the work surface without waiting for the pusher to return to its original or starting position, and thus the above described cooperation between the stacking mechanism and input feed mechanism eliminates one possible delay in the overall operation of the machine and thereby increases the rate of operating speed thereof.

Accordingly, it is an object of the instant invention to provide a continuous three-knife trimmer which is comprised of a plurality of sub-assemblies which operate at cycle speed to effect high-speed assembly-line trimming of up to three edges of a book, magazine or other similarly stacked material.

It is a further object of the instant invention to provide such a trimmer which includes stacking mechanism for automatically stacking a predetermined quantity of material on said work surface, wherein the trimmer stacking mechanism comprises a containing enclosure including at least one pair of oppositely disposed walls comprised of at least one closed loop endless belt having a plurality of projecting supporting fingers pivotally mounted thereon.

Yet another object of the instant invention is to provide such a continuous three-knife trimmer wherein the stacking mechanism work surface and input feed mechanism cooperate in such a manner as to permit a subsequent quantity of material to be deposited on the work surface before the pusher or transport means of the input feed mechanism returns to its starting position.

Still another object of the instant invention is to provide such a continuous three-knife trimmer which is interrelated through a geared driving mechanism driven by a single source of power so as to assure synchronized operation of the entire apparatus and thereby increase the capability thereof.

Other objects and a fuller understanding of the invention may be had by referring to the following description and drawings. in which:

FIG. 2 is a side view, partially in section, taken along the arrows 2—2 of FIG. 1;

FIG. 3 is a sectional view of the stacking mechanism shown in FIG. 1, taken along the arrows 3—3 thereof;

FIG. 4 is a detailed view of the stacking mechanism of FIG. 1 and taken along the arrows 4—4 thereof; and FIG. 5 is a detailed view of the input feed mechanism of FIG. 1 and taken along the arrows 5—5 thereof.

Figure 1:
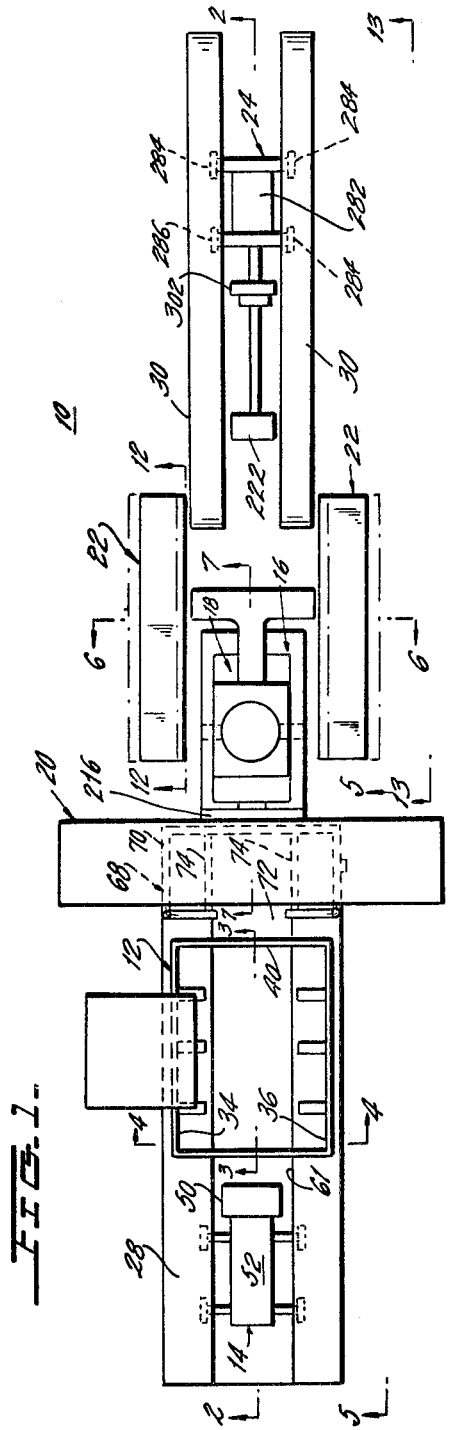
FIG. 1 is a plan view of the continuous three-knife trimmer of the instant invention.

Referring to FIGS. 1 and 2, there is shown a continuous three-knife trimmer 10 constructed in accordance with the teachings of the instant invention. As has been previously noted, the three-knife trimmer 10 is capable of rapidly and accurately trimming up to three edges of a book, magazine or other similarly stacked paper material in a fully automatic, continuous operation. For ease of identification and nomenclature, throughout the remainder of this specification, the material to be trimmed by the instant invention will be referred to as a book, although it is to be understood that the instant invention is equally applicable to a stack of books, a magazine or stack of magazines, or any other similarly stacked quantity of paper material capable of being trimmed in a guillotine fashion.

The trimmer of FIGS. 1 and 2 may be conveniently broken down into eight sub-assemblies, which were briefly outlined above. They include a stacking mechanism generally indicated at 12; an input feed mechanism 14; a movable work table 16; a transportable clamp 18; stop mechanism 19 (not shown in FIGS. 1 and 2); a front knife assembly 20; two side knife assemblies 22; and a delivery mechanism generally indicated by the reference character 24. The operation of the stacking mechanism of the three-knife trimmer 10 may be briefly summarized as follows:

A book 26 is initially fed into stacking mechanism 12 whereby it is deposited upon the slotted work surface 28 therebelow. Input feed mechanism 14 pushes the book 26 through the front knife assembly 20, against a back stop (not shown), and onto the movable table 16 initially occupying the solid line position shown in FIG. 2. Then, the book is clamped, trimmed, unclamped and delivered from the trimmer.

Referring most specifically to FIGS. 3 and 4, the stacking mechanism 12 is seen to comprise a containing enclosure 32 which includes two pairs of oppositely disposed walls 34, 36 and 38, 40, respectively. Walls 34 and 36 each comprise a plurality of closed loop endless belts 42 upon which are pivotally mounted a plurality of projecting fingers 44. The fingers 44 are spring-biased, by means not shown, to occupy one of two positions illustrated as 44' and 44'' in FIG. 4, which represent non-supporting and supporting positions, respectively.

In operation, books 26 are transported to a position above the enclosure 32 by means of conveyor belt 46. After passing by and registering their presence on any suitable counter 48, the books are dumped into the containing enclosure or hopper 32. After a predetermined number of books have been counted by the counter 48 and deposited on the extending fingers 44'', a pair of electromagnets 50 are automatically operated such that their respective armatures 52 strike the next pair of fingers 44 so as to rotate them from their nonsupporting position 44' to their extended supporting position 44'' whereby the next predetermined and counted quantity of books may be deposited thereon.

As the pairs of fingers 44'' approach and pass beneath the work surface 28, the consecutively stacked quantities of books are deposited thereon. After each pair of fingers 44'' comes up from beneath the surface 28, they engage the fixed rods 54 whereby they are once more returned to their non-extended, non-supporting position 44' where they remain until struck by the armatures 52. It will be apparent that simple adjustment of the energizing counter 48 will control the quantity of material which is continuously deposited upon the work surface 28.

It may be noted that, although not shown, the walls 34 and 36 are movable relative to each other to vary the width of the containing enclosure or hopper 32 so that it may accommodate books of different widths.

As may be most clearly seen in FIGS. 2 and 3, the second pair of side walls 38, 40 do not extend all the way to the work surface 28. To the contrary, the bottom edges thereof are a predetermined distance above such work surface. Such space is provided to permit the pusher or transport means 50 of the input feed mechanism 14 to pass through the enclosure 32 to deliver the stacked books 26 through the front knife assembly 20 and onto the work table 16. Although not specifically shown, walls 38, 40 may be adjustable relative to one another to vary the length of the enclosure 32.

Referring most specifically to FIG. 5, there is shown a detailed view of the input feed mechanism 14 and the manner in which it cooperates with the stacking mechanism 12 schematically represented by the lower portion of the side walls 38, 40 thereof. The purpose of the input feed mechanism is to transport the book 26, which has been deposited on the work surface 28 by the stacking mechanism 12, from its first position immediately beneath the stacking mechanism 12, through the front knife assembly 20, against the back stop, to its second position on the movable table 16.

To accomplish such movement there is provided the pusher 50 which is secured to the trolley 52 mounted on rollers 54 and 56. As will be further explained, in response to activation of the input feed driving mechanism, generally indicated at 58, the trolley 52 and pusher 50 carried thereby is movable on rollers 54 and 56 from the initial starting position shown in solid lines in FIG. 5 to a finishing position indicated by the dotted pusher 50' in FIG. 5 whereby the book 26 will have been moved from beneath the stacking mechanism 12, through the front knife assembly 20, and onto the movable work table 16.

During its path of movement from its starting to finishing position thus defined, the trolley carrying rollers 54 and 56 are guided by an upper track or guide 60 such that although the trolley 52 and rollers 54, 56 are beneath the work surface 28, the pusher 50 extends up through the slot 61 (see FIG. 1) in the work surface 28 to engage and push the book 26.

As shown in FIG. 5, when the main transport clamp 18 bottoms on the book 26 and causes the link 76 and members secured thereto to rotate the switch 90 to the up position shown in FIG. 5, the trolley 52 has reached its rightmost point of travel in FIG. 5 such that the front wheel 56 thereof abuts the front surface 64 of the work surface 28. Consequently as the trolley is returned to its starting position shown at the left hand side of FIG. 5 under the influence of input feed driving mechanism 58, the front wheel 56 is guided by the under surface 92 into a second or lower track 94. Thus as the trolley 52 continues its rearward motion back toward its starting position, the pusher 50 is automatically lowered through the slot 61 of the work surface 28 to a position below that surface; and the trolley may be returned to its initial or starting position even while a second book 26 is being deposited above the returning trolley and pusher by the stacking mechanism 12. It becomes apparent therefore that the cooperation of the stacking mechanism and input feed mechanism inherently increases the capabilities of the instant invention by eliminating the time lag which would otherwise occur if the deposit of subsequent books had to wait for the pusher 50 to be returned through the containing enclosure 32 of the stacking mechainsm 12.

Further discussion of the structure and operation of the input feed mechanism and of the rest of the trimmer subassemblies can be obtained from aforementioned U.S. Pat. No. 3,424,044.

All subassemblies of the instant invention are operated at cycle speed, in this case chosen as 100 r.p.m., capable therefore of trimming books at the rate of 100 units per minute. Furthermore, since all subassemblies are operated by cams controlled by the single power source all subassemblies will be inherently synchronized with respect to each other.

Thus there has been described a depositing and stacking mechanism for a continuous three-knife trimmer.

Although there has been described a preferred embodiment of this novel invention, many variations and modifications will now be apparent to those skilled in the art. Therefore, this invention is to be limited, not by the specific disclosure herein, but only by the appending claims.

What is claimed is:

1. Mechanism for stacking a predetermined quantity of material comprising a containing enclosure including a first pair of oppositely disposed walls, each of which comprises at least one closed loop endless belt, said belts including a plurality of projecting fingers pivotally mounted thereon and selectively movable between a supporting position in which said fingers are capable of supporting said material and a non-supporting position in which said fingers are not capable of supporting said material; said containing enclosure being positioned on a substantially planar work surface; and individual ones of such projecting fingers on said oppositely disposed belts being pivotally mounted on their respective belts at approximately the same distance from said work surface at all times to define individual pairs of oppositely disposed material supporting fingers; and further including automatic means for moving the finyers of one of said individual pairs of oppositely disposed material supporting fingers from their non-supporting to their supporting positions after a predetermined quantity of material has accumulated on a preselected individual pair of oppositely disposed material supporting fingers located beneath said one of said individual pairs and closer to said work surface.

2. The mechanism of claim 1, wherein a portion of said closed loop endless belts passes beneath said work surfaces; and said one of said individual pairs of oppositely disposed material supporting fingers remains in its supporting position until a predetermined time after it has passed under said work surface.

3. The mechanism of claim 2, and further including blocking means for automatically returning the fingers of said one of said individual pairs to their non-supporting position a predetermined time after it has passed under said work surface.

4. The mechanism of claim 2, wherein said containing enclosure includes a second pair of oppositely disposed walls transversely oriented with respect to said first pair of oppositely disposed walls; said second pair of walls extending transverse to said surface but being spaced a predetermined distance therefrom to facilitate removal of material which is deposited on said work surface by said one of said individual pairs of oppositely disposed material supporting fingers as they pass under said work surface.

References Cited

UNITED STATES PATENTS

| 835,312 | 11/1906 | McNabb | 198—163 |
| 3,381,830 | 5/1968 | Vasse | 214—6 |

RICHARD E. AEGERTER, Primary Examiner